United States Patent

Woerner et al.

[11] Patent Number: 5,700,079
[45] Date of Patent: Dec. 23, 1997

[54] HEADLIGHT FOR VEHICLE

[75] Inventors: Bernhard Woerner; Kurt Haug, both of Reutlingen; Thomas Fabry, Neckartenzlingen; Peter Kusserow, Sonnenbuehl; Bert Jenner, Hamburg, all of Germany

[73] Assignee: Robert Bosch GmbH, Stuttgart, Germany

[21] Appl. No.: 314,195

[22] Filed: Sep. 28, 1994

[30] Foreign Application Priority Data

Oct. 12, 1993 [DE] Germany .................. 43 34 721.5

[51] Int. Cl.$^6$ .................................................. B60Q 1/04
[52] U.S. Cl. ................... 362/80; 362/61; 362/226; 362/263
[58] Field of Search .................... 362/226, 61, 80, 362/267, 265, 263, 310; 313/318.11, 318.12

[56] References Cited

U.S. PATENT DOCUMENTS

| 4,287,448 | 9/1981 | Bradley | 363/318.11 X |
| 4,300,188 | 11/1981 | Addario | 362/80 |
| 4,471,413 | 9/1984 | Dick | 362/80 |
| 4,513,356 | 4/1985 | Mikola | 362/226 |
| 4,772,989 | 9/1988 | Maraden | 362/80 |
| 4,822,302 | 4/1989 | Dorleans | 362/226 X |
| 5,188,444 | 2/1993 | Makita | 362/267 X |

FOREIGN PATENT DOCUMENTS 4134101  4/1992  Germany .

*Primary Examiner*—Thomas M. Sember
*Attorney, Agent, or Firm*—Michael J. Striker

[57] ABSTRACT

A headlight has a housing accommodating a gas discharge lamp and opening is closeable by a closing part. The gas discharge lamp is connectable by an electrical conductor with a voltage source, which is provided with a plug connection. The first plug part is arranged on the housing while the second plug part is releasable from outside of the housing. The releasable plug part blocks the cover in its position in which it closes the opening so that a removal of the cover for releasing the opening can be performed only after removal of the plug part. It is therefore guaranteed that no voltage applies to the parts of the headlight.

6 Claims, 3 Drawing Sheets

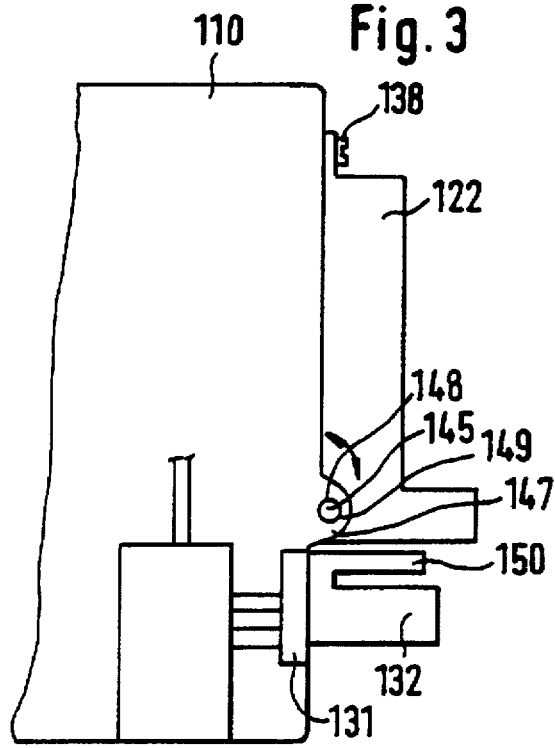
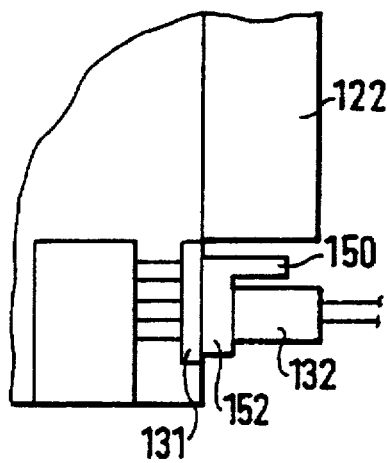
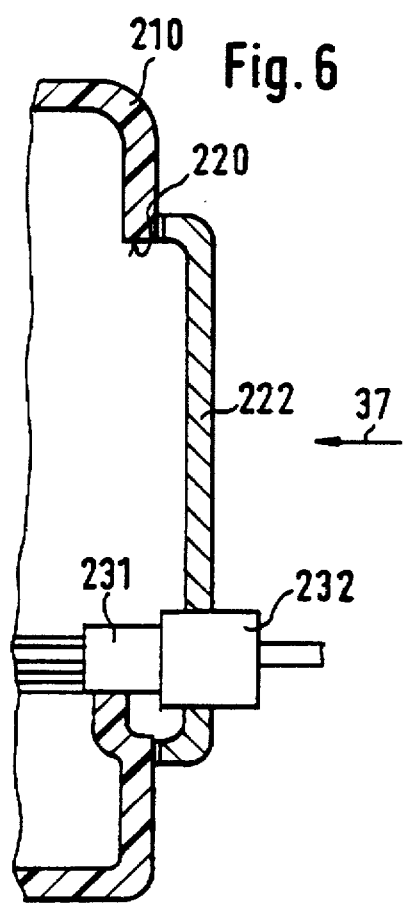
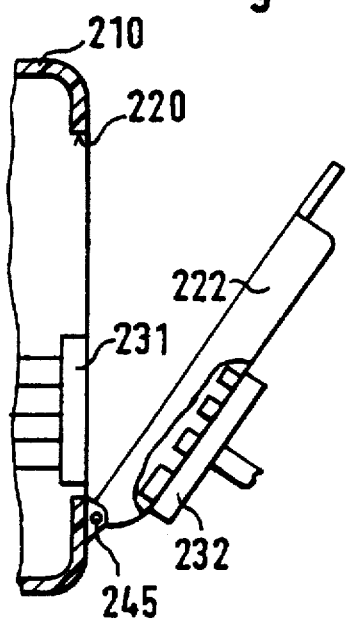

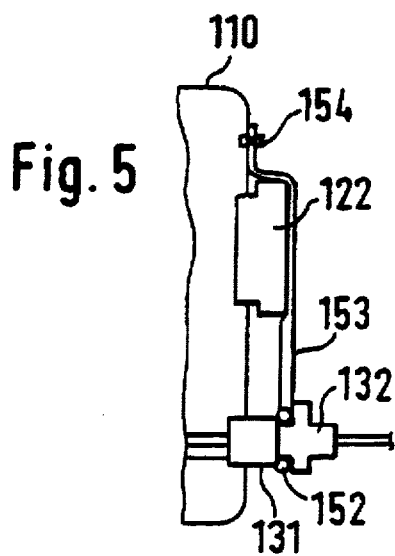
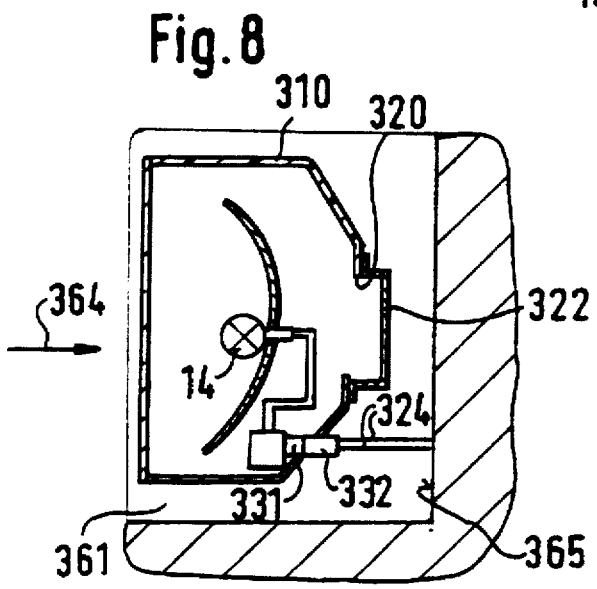
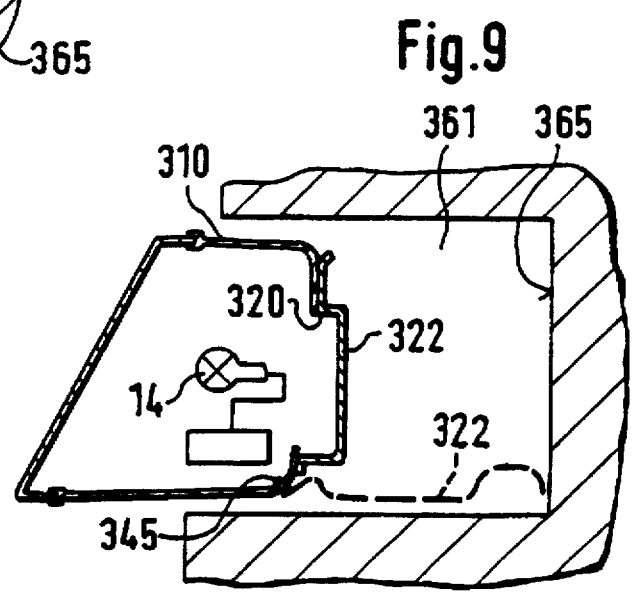

HEADLIGHT FOR VEHICLE

BACKGROUND OF THE INVENTION

The present invention relates to a headlight for vehicles.

More particularly, it relates to a headlight for vehicles which has a housing accommodating a gas discharge lamp connectable with a voltage source and an opening which is closeable by a closing part.

Headlights of the above mentioned general type are known in the art. One of such headlights is disclosed for example in the German document DE 41 34 101 A1. In this headlight the housing which accommodates the gas discharge lamp is provided at its rear side with an opening which is closeable by a housing forming the closing part and receiving an electrical pre-switching device for the gas discharge lamp. The part of the plug connection for electric conductors is provided on the closing part and serves for connecting the gas discharge lamp with the voltage source. A high voltage is applied to the gas discharge lamp for its operation in a known manner. The closing part is mounted on the headlight housing by screws which accessible only from the inner side of the headlight housing. Thereby the closing part can be applied only during mounting and can no longer be removed. Due to this arrangement of the closing part it is ensured that the gas discharge lamp or voltage-conducting parts arranged inside the headlight housing cannot be contacted during the operation of the gas discharge lamp which can be life threatening due to the high voltage. The disadvantage of this arrangement of the closure part is however the interior of the headlight housing after the mounting of the headlight is no longer accessible and therefore any change of the gas discharge lamp or of other parts inside the housing is no longer possible.

SUMMARY OF THE INVENTION

Accordingly, it is an object of the present invention to provide a headlight for a vehicle which avoids the disadvantages of the prior art.

In keeping with these objects and with others which will become apparent hereinafter, one feature of the present invention resides, briefly stated, in a headlight of the above mentioned general type in which the closing part is removable from outside of the headlight housing for releasing the opening and the removable plug part of the closure part is blocked in its position in which it closes the opening.

In accordance with another modification of the invention the closing part can be removable from outside of the headlight housing for releasing the opening, a stationary plug part can be arranged on the headlight housing so that the removable plug part arranged on the closing part cooperates with it, and therefore during mounting or removing of the closing part the plug connection is produced or interrupted.

Finally, in accordance with still another modification of the present invention, the closure part can be removable from outside of the headlight housing for releasing the opening, the mounting space of the headlight on the vehicle is limited by the parts of the vehicle so that a removal of the closing part for releasing the opening is possible only when the headlight is removed from the mounting space.

When the headlight is designed in accordance with the present invention, then because of the closing part which is removable from outside of the headlight housing the interior of the headlight housing is accessible. At the same time it is simultaneously guaranteed that with the removed closing part the connection of the gas discharge lamp with the voltage source is separated and therefore no danger due to the high voltage takes place.

In accordance with another feature of the present invention, the removable plug part has at least one electrical connection for the voltage source, which is interrupted in the plug part and the closing part is provided with at least one electrical contact by which the interrupted conductor portions are connected with one another when the plug connection is produced. With this construction it is guaranteed that even when the plug part is damaged, it cannot block the closing part and therefore the danger of high voltage is avoided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a view showing a second embodiment of a headlight in accordance with the present invention;

FIG. 4 is a view showing a variant of the headlight of FIG. 3;

FIG. 5 is a view showing a further variant of the headlight of FIG. 3;

FIG. 6 is a view showing a third embodiment of the headlight in accordance with the present invention;

FIG. 7 is a view showing a variant of the headlight of FIG. 5;

FIG. 8 is a view showing a fourth embodiment of the headlight in accordance with the present invention in a longitudinal section, arranged on a vehicle; and FIG. 9 is view showing a headlight of FIG. 4 in the position removed from the vehicle.

DESCRIPTION OF THE PREFERRED EMBODIMENTS

Figure 1:
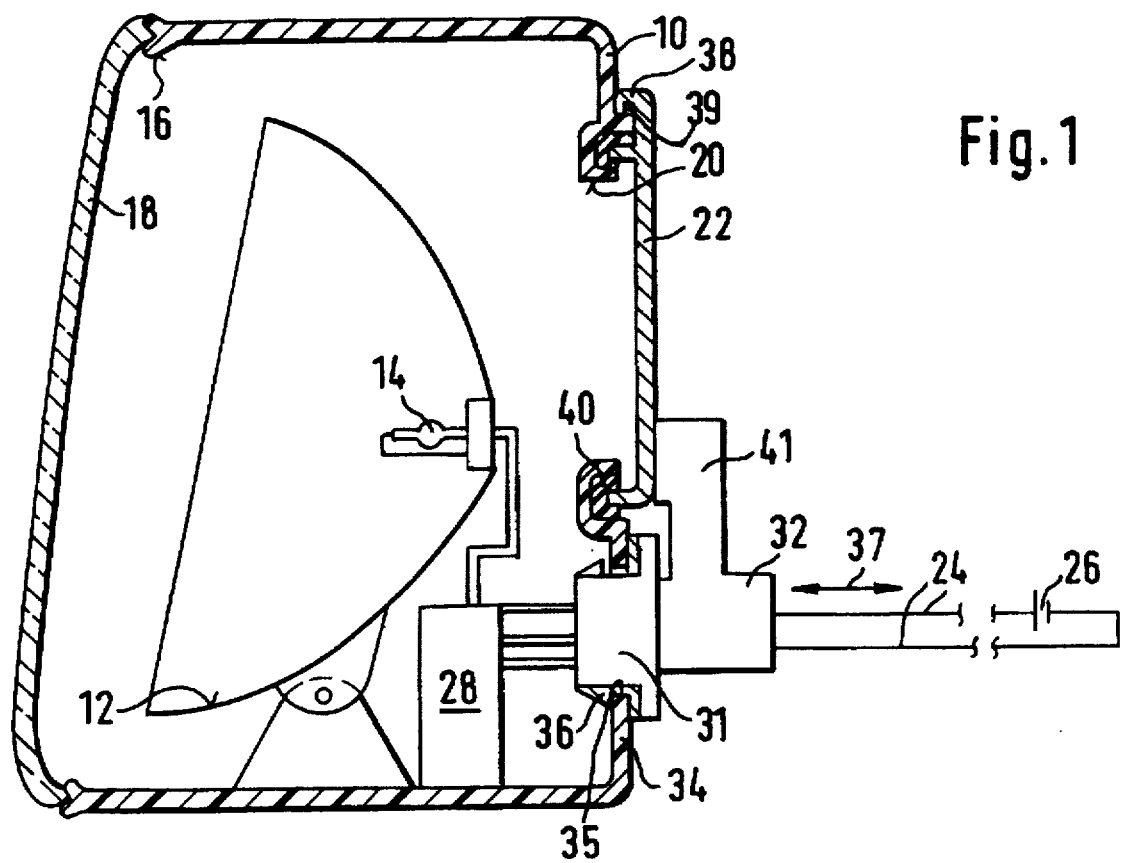
FIG. 1 is a view showing a headlight for a vehicle partially in a vertical longitudinal section in a simplified illustration in accordance with the first embodiment of the present invention.

A headlight for a vehicle, in particular a motor vehicle, shown in FIGS. 1–9 formed for mounting in a chassis of the vehicle. It has a housing 10 accommodating a reflector 12. A gas discharge lamp 14 which forms a light source is arranged in the reflector 12. The headlight housing 10 is composed of synthetic plastic material or another suitable material and has a front light outlet opening 16 which is closed by a transparent cover plate 18. The cover plate is mounted on the front edge of the headlight housing 10. The headlight housing 10 has an opening 20 at its rear side. The opening 20 is closeable by a removable closing part 22 formed as a cover. The opening 20 can be also arranged in another point of the headlight housing 10 depending on the mounting conditions of the headlight on the vehicle.

The gas discharge lamp 14 is connected with a voltage source 26 by one or several electrical conductors 24. The board battery of the vehicle serves as a voltage source.

Between the gas discharge lamp 14 and the voltage source 26 additionally an electrical pre-switching device 28 is arranged. This device converts with the electrical current of the voltage source 26 into alternating voltage and from it the high voltage required for the operation of the gas discharge lamp 14 is produced. The electrical pre-switching device 28 can be arranged inside the headlight housing 10 or outside the same. The pre-switching device 28 can be subdivided into an ignition part and a control part. The ignition part can be arranged inside the headlight housing 10, while the control part can be arranged outside the headlight housing 10.

In the first embodiment shown in FIG. 1, the electrical connection of the gas discharge lamp 14 with the voltage source 26 includes a plug connection 30 with a first plug part 31 arranged on the headlight housing 10 and a removable second plug part 32. The first plug part 31 is held on a wall of the headlight housing 10 near the cover 22 for example by means of an arresting connection. The plug part 31 can be arranged underneath the cover 22 as shown in FIG. 1, or above or laterally near the cover 22 depending on the mounting additions of the headlight in the vehicle. The wall 34 has for this purpose an opening 35 through which a portion of the plug part 31 passes. One or several arresting arms 36 are arranged on the portion and engage on the inner side of the headlight housing 10. The cover 22 is removably connected with the headlight housing 10 so that it can be released from outside of the headlight housing 10 and can be removed for releasing the opening 20. The cover 22 can be mounted and dismounted in direction of the double arrow 37 in FIG. 1. The cover 22 can be mounted on the headlight housing 10 for example by an arresting connection. For this purpose the cover 22 can have one or several arresting arms 38 which are behind corresponding projections 39 of the headlight housing 10. The cover 22 can be however mounted by means of one or several screws on the headlight housing 10 or in another manner so as to be accessible from outside of the headlight housing 10. A sealing element 40 is clamped between the cover 22 and the headlight housing 10 for tightly sealing the interior of the headlight housing 10 from the environment, especially from moisture penetration.

The second housing part 32 is connected with the first plug part 31 and has portion 41 which engages the cover 22 transversely to its demounting direction 37 in the position connected with the first plug part 31. A small as possible distance or no small distance remains between the portion 41 and the cover 22, to prevent that the cover 22 can be inclined or moved. Thereby with the produced plug connection 31 or 32 the cover 22 is blocked in its position in which it closes the opening 22. For dismounting of the cover 22, first the plug part 32 must be removed whereby the connection of the gas discharge lamp 14 with the voltage source 26 is interrupted and therefore no high voltage is applied to the parts of the headlight. Therefore, during an exchange of the gas discharge lamp 14 or other parts arranged inside the headlight of the housing 10, no danger is involved.

Figure 2:
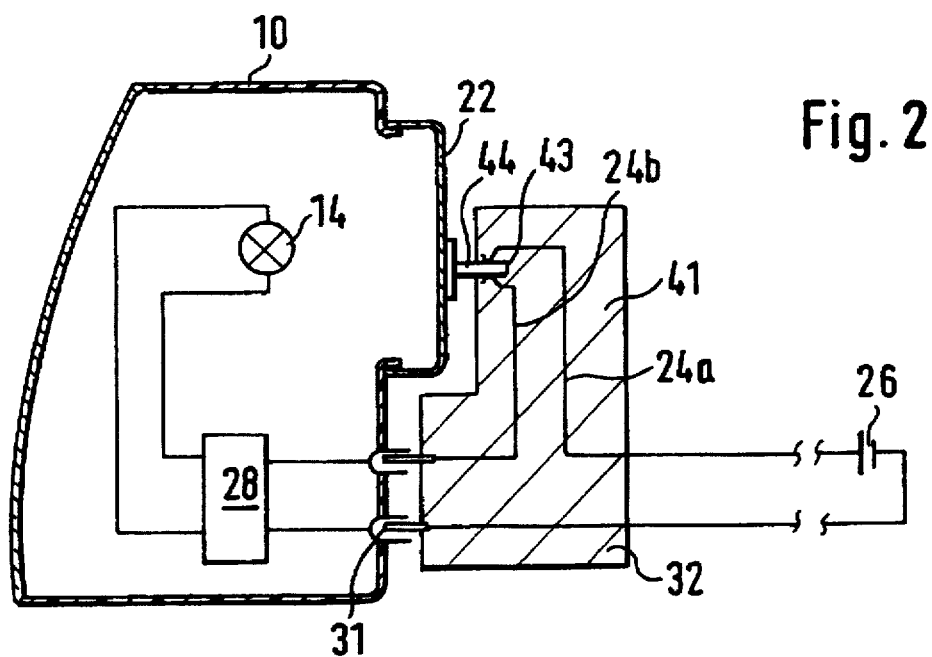
FIG. 2 is a view showing the headlight of FIG. 1 in accordance with another variant of the present invention.

FIG. 2 shows a variant of the headlight of FIG. 1, in which at least one of the electrical conductors 24 is interrupted inside the plug part 32 in the region of the portion 41 engages the cover 22. The portion 41 has an opening 43 facing the cover 22, and both interrupted conductor portions 24a and 24b extend in it. An electrically conductive contact pin 44 which faces outwardly is arranged on the cover 22. During mounting of the second plug part 32 in the first plug part 31 it is inserted in the opening 42 and in the end position of the second plug part 42, in which the plug connection is produced, connects with one another the conductor portions 24a and 24b. With this construction it is guaranteed that even when the plug part 32 is damaged, when for example its portion 41 is broken, no high voltage is applied to the parts of the headlight, since then the conductor portions 24a, 24b are interrupted.

FIG. 3 shows a second embodiment of the headlight in accordance with the present invention which is formed substantially similar as the first embodiment, and therefore only those parts which are different from the first embodiment are explained hereinbelow. The cover 122 which closes the opening 120 in the headlight housing 110 is turnably supported on the headlight housing 110 on its edge region for turning about an axis 145 arranged in the lower edge region of the cover 122. The arrangement of the turning axis 145 can be selected as required in correspondence with the mounting conditions of the headlight in the vehicle. The cover is mountable removably on the headlight housing 110 in its upper edge region located opposite to the turning axis 145, for example by one or several screws 138. Instead of the screws 138, the cover 122 can be also mounted as the first embodiment by means of an arresting connection on the headlight housing 110. The turnable support of the cover 122 on the headlight housing 110 can be obtained for example by bearing blocks 147 arranged on the headlight housing 110. Each of the bearing blocks 147 are provided with a recess 148 through which a pin 149 engaging in the cover 122 is inserted. During the manufacture of the headlight housing 110 of synthetic plastic material, the bearing blocks 147 can be made of one piece on the housing. The turnable bearing of the cover 122 on the headlight housing 110 is preferably formed so that it cannot be released or at least cannot be released in a simple manner, or in other words the pin 149 cannot be removed, so that a removal of the cover 122 is possible only by turning about the axis 145. The plug connection in this variant is arranged so that the removable plug part 132 blocks a turning movement of the cover 122. In the embodiment shown in FIG. 3 the plug connection is arranged near the turning axis 145, so that the plug part 132 with the produced plug connection blocks the cover 122 in its position in which it closes the opening 120, since the cover 122 abuts with its edge region arranged in the region of the turning axis 145 against the plug part 132. The plug part 132 is provided for this purpose with a projection 150 extending from it toward the cover 122, against which the cover 122 abuts. The plug connection can be however also arranged so that the cover part 132, as in the first embodiment, has a portion 150 engaging the cover 122 at a distance from the turning axis 145 so as to block a turning movement of the cover 122.

In the variant of the headlight of FIG. 3 shown in FIG. 4, the plug connection additionally to the plug parts 131 and 132, also has a further plug part 152 arranged between the aforementioned both plug parts. The further plug part 152 is formed and arranged so that with the produced plug connection it provides the blocking of the cover 122. The further plug part 152, similarly to the second plug part 132, has a projection 150 which acts for blocking the cover 122. The further plug part 152 can also be used with the headlight in accordance with the first embodiment and provided with a portion which engages the cover 22 or 122. The further plug part 152 can also serve as an adaptor, so that the plug part 131 arranged on the headlight housing 110 can be formed always identically. However, the second plug part 132 which belongs to the electrical equipment of the corresponding vehicle can be formed arbitrarily or in other words different from one vehicle type to another vehicle type. The further plug part 152 is adapted at its one side to the plug part 131 arranged on the headlight housing 110 and on the other side to the vehicle-side plug part 132.

The further plug part 152, as shown in FIG. 5 is formed so that it has a band-like portion 153 which can be arranged at the end facing away from the plug part 132. The band-like portion 153 extends over the cover 122 and is non-releasably mounted with its end on a corresponding point of the headlight housing 110, for example by a rivet connection 154. Thereby the cover 122 can be opened only when the plug parts 132 and 152 are removed and the plug connection is separated.

FIG. 6 shows a third embodiment of the headlight in accordance with the present invention, in which it also has the housing 210 with the opening 220 closeable by the cover 222. The plug part 231 arranged on the headlight housing 210 is fixedly arranged in the edge region of the opening 220 inside the headlight housing 210. The second plug part 232 is connected with the cover 222 and extends outwardly beyond it toward the side which faces the inner side of the headlight housing 210. The second plug part 232 can be formed of one piece with the cover 222. The cover 222 is mountable and dismountable in an arrow direction 37 on the headlight housing 210 and can be mounted on the headlight housing as shown in the first and second embodiments. During mounting or removing of the cover 222 also the connection of both plug parts 221 and 232 is positively produced or separated.

FIG. 7 shows a variant of the headlight of FIG. 5 in which the cover 222 as in the second embodiment is mounted on the headlight housing 210 turnably about an axis 245. The plug connection is formed as a so-called multiple plug connection for producing and separating the plug connection during a turning movement of the plug part 232.

FIGS. 8 and 9 show the fourth embodiment of the headlight in which the housing 310 accommodates the gas discharge lamp 14. The headlight housing 310 is provided at its rear side with the opening 320 closeable by the cover 322. The electrical conductors 334 for connecting the gas discharge lamp 14 with the voltage source 26 with a plug connection composed of two plug parts 331 and 332. At least the plug part 332 which is located at the vehicle side is arranged outside of the headlight housing 310. The plug part 331 located at the headlight side can be arranged as in the previous embodiments on the headlight housing 310 or also outside the headlight housing 310.

The cover 322 is mountable on the headlight housing 310 similarly to the above described embodiments so that it can be removed from the outside of the headlight housing 310 for releasing the opening 320.

The headlight is arranged on the vehicle in a mounting space 361 in which for example it is inserted from the front side of the vehicle opposite to the traveling direction in the direction of the arrow 364 or can be removed from it. The mounting space 361 is limited by a part 365 of the vehicle, for example a chassis part or an aggregate. The mounting space is limited toward the rear side of the headlight so that the cover 322 cannot be removed for releasing the opening 320 in the mounted condition of the headlight in the mounting space. The connecting conductors 24 arranged outside of the headlight housing 310 are so short that they allow no or only small movement of the headlight so that the cover 322 cannot be removed. For removing the cover 322, first the plug connection 331, 332 must be disconnected, so that the headlight can be taken from the mounting space and then the cover 322 can be removed. Due to the positively separated plug connection 331, 332 it is guaranteed that no high voltage is applied to the parts of the headlight.

Preferably, the cover 322 as in the second embodiment, is turnably supported on the headlight housing 310 for turning about an axis 345, while the support of the cover 322 is not releasable. Therefore, the cover 322 cannot be completely removed from the headlight housing 310 but instead remains in a position in which it releases the opening 320 as shown in FIG. 8 in a broken line. It is held on the headlight housing 310 and extends outwardly beyond the rear side of the headlight housing 310. When during mounting of the headlight in the mounting space on the vehicle the cover 322 is not in the position in which it closes the opening 320, it is disturbed during the mounting of the headlight and the headlight cannot be inserted to its end position since the cover 322 comes to abutment against parts which limit the mounting space from the rear side of the headlight. Since the plug connection 331, 332 because-of the short conductors 24 can be produced only with the headlight completely inserted into the mounting space, it is guaranteed that when the cover 322 is opened no high voltage is applied to the headlight.

It will be understood that each of the elements described above, or two or more together, may also find a useful application in other types of constructions differing from the types described above.

While the invention has been illustrated and described as embodied in a headlight for vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A headlight for a vehicle, comprising a housing having an opening; a gas discharge lamp arranged in said housing; a closing part which closes said opening; a voltage source with which said gas discharge lamp is connectable; connecting means for connecting said gas discharge lamp with said voltage source and including a plug connection with a releasable plug part arranged outside said housing, said closing part being removable from outside of said housing for releasing said opening, said releasable plug part blocking said closing part in a position in which said closing part closes said opening.

2. A headlight as defined in claim 1, wherein said plug connection has a plug part which is stationarily arranged on said housing and also said releasable plug part.

3. A headlight as defined in claim 1, wherein said releasably plug part has a region which overlaps said closing part for blocking said closing part.

4. A headlight as defined in claim 3, wherein said releasable plug part is provided with at least one electrical connecting conductor for said voltage source which electrical connecting conductor is interrupted in said releasable plug part; and further comprising at least one electrical contact arranged on said closing part so that when said plug connection is produced it connects interrupted conductor portions with one another.

5. A headlight as defined in claim 1, wherein said releasable plug part has a band-shaped portion overlapping said closing part and mounted non-releasably on said releasable plug part and on said housing.

6. A headlight as defined in claim 1, wherein said closing part is turnable about an axis for closing and opening said opening, said releasable plug part being arranged so that it blocks a turning movement of said closing part.

* * * * *